US012742756B2

(12) United States Patent
Watanabe et al.

(10) Patent No.: US 12,742,756 B2
(45) Date of Patent: Sep. 22, 2026

(54) DATA PROCESSING SYSTEM FOR CHROMATOGRAPH

(71) Applicant: SHIMADZU CORPORATION, Kyoto (JP)

(72) Inventors: Satoru Watanabe, Kyoto (JP); Tomohiro Kawase, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 707 days.

(21) Appl. No.: 17/836,520

(22) Filed: Jun. 9, 2022

(65) Prior Publication Data

US 2022/0412929 A1 Dec. 29, 2022

(30) Foreign Application Priority Data

Jun. 25, 2021 (JP) ................................ 2021-105340
Apr. 15, 2022 (JP) ................................ 2022-067375

(51) Int. Cl.
*G01N 30/86* (2006.01)

(52) U.S. Cl.
CPC ..... *G01N 30/8631* (2013.01); *G01N 30/8641* (2013.01)

(58) Field of Classification Search
CPC . G01N 30/8631; G01N 30/8641; G01N 30/86
See application file for complete search history.

(56) References Cited

U.S. PATENT DOCUMENTS 5,209,853 A * 5/1993 Lynch ................ G01N 30/8693 210/656
5,804,142 A * 9/1998 Ito ......................... G01N 30/88 700/273

(Continued)

FOREIGN PATENT DOCUMENTS

DE 102020114618 A1 * 8/2020 ............ G01N 30/86
JP H07239326 A * 9/1995

(Continued)

OTHER PUBLICATIONS

Office Action for corresponding Chinese Patent Application No. 202210585300.5 dispatched Apr. 23, 2025 with machine translation.

(Continued)

*Primary Examiner* — Yossef Korang-Beheshti
(74) *Attorney, Agent, or Firm* — Renner, Otto, Boisselle, & Sklar, LLP

(57) ABSTRACT

A data processor (10) that performs data processing on a plurality of the chromatograms stored in the data storage part (8) is provided. The data processor (10) is capable of executing automatic identification for automatically performing identification processing. In the identification processing, one chromatogram among the plurality of the chromatograms is set as a reference chromatogram, a plurality of component peaks on the reference chromatogram is set as reference peaks, and it is identified which component peaks among component peaks on other chromatograms than the reference chromatogram among the plurality of the chromatograms corresponds to each of the plurality of the reference peaks. In the automatic identification, the data processor (10) is configured to identify component peaks corresponding to each of the reference peaks by executing filtering using a reference parameter for peak parameters of each of component peaks on the other chromatograms.

3 Claims, 6 Drawing Sheets

(56) References Cited

U.S. PATENT DOCUMENTS

| | | | | |
|---|---|---|---|---|
| 2014/0020455 | A1* | 1/2014 | Shiohama | G01N 30/8644 73/61.55 |
| 2014/0129169 | A1* | 5/2014 | Noda | G01N 30/8665 702/89 |
| 2015/0253295 | A1 | 9/2015 | Ohashi | |
| 2019/0113487 | A1 | 4/2019 | Sugimoto | |
| 2019/0353627 | A1 | 11/2019 | Kurotobi et al. | |
| 2020/0088700 | A1 | 3/2020 | Yamaguchi | |
| 2020/0340961 | A1* | 10/2020 | Kunimura | G01N 30/8679 |
| 2022/0187259 | A1* | 6/2022 | Burton | G01N 30/14 |
| 2022/0373522 | A1* | 11/2022 | Kanazawa | G01N 27/62 |

FOREIGN PATENT DOCUMENTS

| | | | | | |
|---|---|---|---|---|---|
| JP | 2009229150 | A | | 10/2009 | |
| JP | 2009281848 | A | * | 12/2009 | |
| JP | 2011220907 | A | * | 11/2011 | G01N 30/8665 |
| JP | 2015-166724 | A | | 9/2015 | |
| JP | 2020180826 | A | | 11/2020 | |
| WO | 2014068786 | A1 | | 5/2014 | |
| WO | 2017179154 | A | | 10/2017 | |
| WO | 2018134998 | A1 | | 7/2018 | |
| WO | 2018167986 | A1 | | 9/2018 | |

OTHER PUBLICATIONS

Office Action for corresponding Japanese Patent Application No. 2022-067375 dated Jan. 6, 2026, with machine translation.

Office Action for corresponding Japanese Patent Application No. 2022-067375 dated Apr. 7, 2026, with machine translation.

* cited by examiner

FIG. 3

PEAK IDENTIFICATION SETTING

| USE | PEAK PARAMETER | FILTERING CONDITION |
|---|---|---|
| ✔ | PEAK NUMBER | ±3 |
| ✔ | AREA | ±10% |
| ☐ | HEIGHT | ±10% |
| ☐ | AREA% | ±10% |
| ☐ | HEIGHT% | ±10% |

OK CANCEL

CONDITION 1

| | PEAK ID | HEIGHT | AREA% | HEIGHT% |
|---|---|---|---|---|
| 1 | – – – | – – – | – – – | – – – |
| 2 | – – – | – – – | – – – | – – – |
| 3 | – – – | – – – | – – – | – – – |
| 4 | – – – | – – – | – – – | – – – |
| | | | | |
| | | | | |

CONDITION 2

| | PEAK ID | HEIGHT | AREA% | HEIGHT% |
|---|---|---|---|---|
| 1 | – – – | – – – | – – – | – – – |
| 2 | – – – | – – – | – – – | – – – |
| 3 | – – – | – – – | – – – | – – – |
| 4 | – – – | – – – | – – – | – – – |
| | | | | |
| | | | | |

CONDITION 3

| | PEAK ID | HEIGHT | AREA% | HEIGHT% |
|---|---|---|---|---|
| 1 | – – – | – – – | – – – | – – – |
| 2 | – – – | – – – | – – – | – – – |
| 3 | – – – | – – – | – – – | – – – |
| 4 | – – – | – – – | – – – | – – – |
| | | | | |
| | | | | |

DATA PROCESSING SYSTEM FOR CHROMATOGRAPH

BACKGROUND OF THE INVENTION

1. Field of the Invention

The present invention relates to a data processing system for a chromatogram obtained by chromatographic analysis such as liquid chromatographic analysis.

2. Description of the Related Art

In order to obtain a desirable analysis result in liquid chromatographic analysis, it is necessary to perform analysis under an analysis condition suitable for a sample, and it is necessary to set an analysis condition for each sample (see Japanese Patent Laid-open Publication No. 2015-166724). In order to search for an optimum analysis condition for a sample, it is common to perform analysis under a plurality of different analysis conditions for the same sample and determine an analysis condition based on a plurality of analysis results obtained by the analysis.

SUMMARY OF THE INVENTION

In order to search for an optimum analysis condition for a sample, it is necessary to relatively evaluate a component peak appearing in each of a plurality of chromatograms obtained by analysis under different analysis conditions, and so far, the user has performed identification processing of associating component peaks appearing in chromatograms with each other while checking the chromatograms one by one. However, such identification work is very complicated, and has hindered rapid search for an analysis condition.

In view of the above, an object of the present invention is to provide a data processing system for chromatography that enables rapid search for an optimum analysis condition for a sample.

A first aspect of a data processing system for a chromatograph according to the present invention includes a data storage part that stores a plurality of chromatograms acquired by chromatographic analysis of the same sample under a plurality of mutually different analysis conditions, and a data processor that performs data processing on a plurality of the chromatograms stored in the data storage part. The data processor is capable of executing automatic identification for automatically performing identification processing. In the identification processing, one chromatogram selected from a plurality of the chromatograms stored in the data storage part is set as a reference chromatogram, a plurality of component peaks on the reference chromatogram are set as reference peaks, and it is identified which component peaks among component peaks on the other chromatograms than the reference chromatogram among a plurality of the chromatograms corresponds to each of a plurality of the reference peaks. In the automatic identification, the data processor is configured to set peak parameters of each of the plurality of reference peaks as reference parameters for each of the plurality of reference peaks, and to identify component peaks corresponding to each of a plurality of the reference peaks by executing filtering using the reference parameters for peak parameters of each of component peaks on the other chromatograms.

A second aspect of a data processing system for a chromatograph according to the present invention includes a data storage part that stores a plurality of chromatograms acquired by chromatographic analysis of the same sample under a plurality of mutually different analysis conditions, and a data processor that performs data processing on a plurality of the chromatograms stored in the data storage part. Manual identification for the user to manually perform identification processing can be executed. In the manual identification, one chromatogram selected from a plurality of the chromatograms stored in the data storage part is set as a reference chromatogram, a plurality of component peaks on the reference chromatogram are set as reference peaks, and it is identified which component peaks among component peaks on the other chromatograms other than the reference chromatogram among a plurality of the chromatograms corresponds to each of a plurality of the reference peaks can be executed, and in the manual identification, the data processor is configured to require the user to select a reference peak to be identified among a plurality of the reference peaks and to enable the user to continuously or collectively execute operation of identifying a plurality of component peaks corresponding to the reference peak to be identified in a state where a list of the other chromatograms is displayed.

Here, capable of "continuously" executing operation of identifying a plurality of component peaks corresponding to a reference peak to be identified means that it is possible to continuously identify a component peak corresponding to the reference peak to be identified in a state where the reference peak is fixed. Further, capable of "collectively" executing operation of identifying a plurality of component peaks corresponding to a reference peak to be identified means that it is possible to set a plurality of component peaks to be in a state of being simultaneously selected, and identify these component peaks as component peaks corresponding to the reference peak to be identified.

According to the first aspect of the data processing system for a chromatograph according to the present invention, it is possible to execute the automatic identification in which the identification processing of associating component peaks with each other between a plurality of chromatograms is automatically performed by executing filtering using a peak parameter of each component peak. Therefore, it is not necessary for the user to perform operation of identifying component peaks having a correspondence relationship while checking a plurality of chromatograms one by one, and it is possible to quickly search for an analysis condition optimum for a sample.

According to the second aspect of the data processing system for a chromatograph according to the present invention, it is possible to execute the manual identification for the user to manually perform the identification processing of associating component peaks with each other between a plurality of chromatograms, and in the manual identification, the system is configured such that the user can continuously or collectively execute operation of identifying a plurality of component peaks in a correspondence relationship in a state where a plurality of chromatograms is displayed in a list. Therefore, it is not necessary for the user to perform operation of identifying component peaks in a correspondence relationship while checking a plurality of chromatograms one by one, and it is possible to quickly search for an analysis condition optimum for a sample.

BRIEF DESCRIPTION OF THE DRAWINGS

FIG. 3 is a flowchart illustrating an example of operation in manual identification in the embodiment;

DETAILED DESCRIPTION OF THE INVENTION

Hereinafter, an embodiment of a data processing system according to the present invention will be described with reference to the accompanying drawings.

Figure 1:
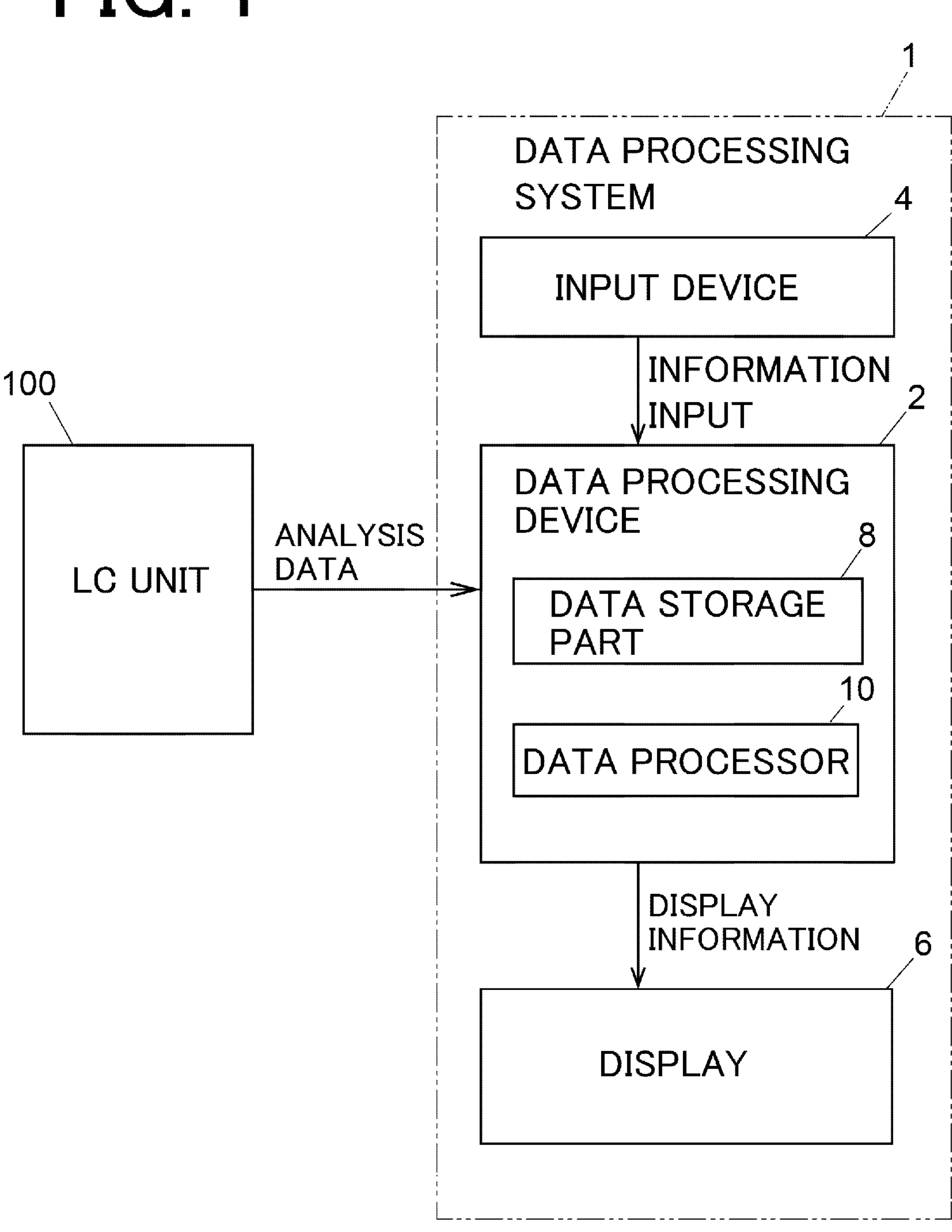
FIG. 1 is a block diagram illustrating an embodiment of a data processing system.

FIG. 1 illustrates a schematic configuration of the data processing system.

A data processing system 1 includes a data processing device 2, an input device 4, and a display 6. The data processing device 2 is a computer device such as a personal computer (PC) equipped with an electronic circuit equipped with a central processor (CPU) and an information storage device such as a hard disk drive or a flash memory. The data processing device 2 includes a data storage part 8 and a data processor 10. The data storage part 8 is realized by a partial storage area of the information storage device, and the data processor 10 is realized by the CPU and software executed by the CPU.

The input device 4 is a device, such as a keyboard and a mouse, for the user to input information to the data processing device 2. The display 6 is a device such as a liquid crystal monitor that displays information given from the data processing device 2.

Analysis data obtained by an LC unit 100 that performs liquid chromatographic analysis is input to the data processing device 2. The analysis data acquired by the LC unit 100 includes a plurality of pieces of analysis data obtained by analysis performed on the same sample under a plurality of mutually different analysis conditions. In the data processing device 2, the data processor 10 creates a list (hereinafter, referred to as a peak table) of a plurality of chromatograms based on each of a plurality of pieces of analysis data from the LC unit 100 and information on component peaks on the chromatograms, and these pieces of data are stored in the data storage part 8 as a data set. Examples of the information on component peaks on chromatograms include a peak area, a peak height, a peak area ratio, and a peak height ratio. The peak area ratio means a ratio of a peak area of a target component peak to a total area of all component peaks appearing on the same chromatogram. The peak height ratio means a ratio of a peak height of a target component peak to a total height of all component peaks appearing on the same chromatogram. Further, in a case where the LC unit 100 includes a device, for example UV detector, for measuring spectrum of an eluent from a separation column, the analysis data includes a spectrum information at each retention time. In such a case, the information on component peaks on each of the chromatograms can include the spectrum information. Furthermore, in a case where the LC unit 100 includes a Mass spectrometer as an auxiliary detector, the information on component peaks on each of the chromatograms can include a Mass spectrum, and/or m/z which is value of horizontal axis of the Mass spectrum.

The data processor 10 is configured to be capable of executing automatic identification for automatically executing identification processing and manual identification for the user to manually perform the identification processing. The identification processing is processing of associating component peaks appearing in a plurality of chromatograms obtained by analysis of the same sample under a plurality of mutually different analysis conditions. The automatic identification and the manual identification are executed when an execution instruction of each mode is input by the user via the input device 4.

Figure 2:
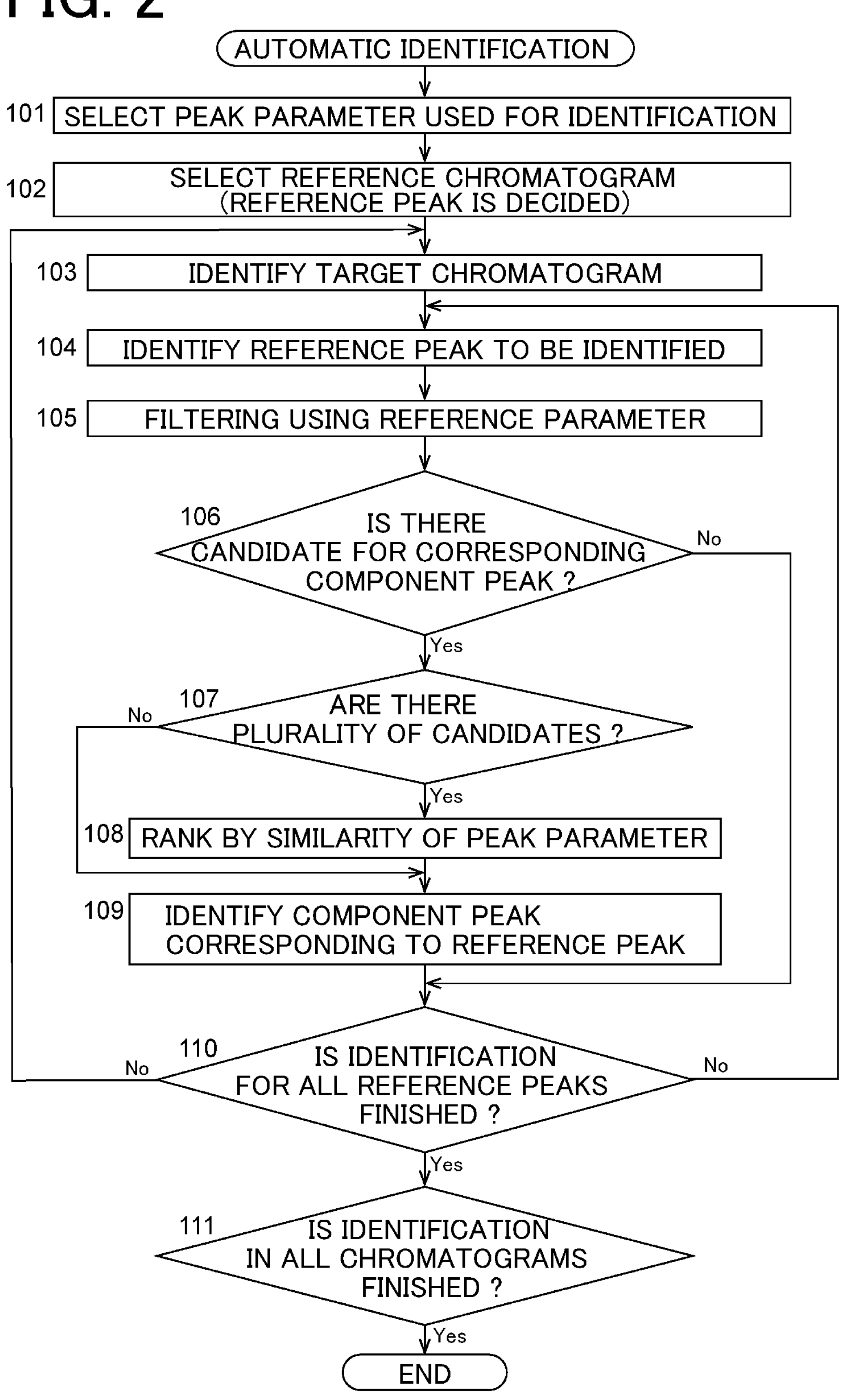
FIG. 2 is a flowchart illustrating an example of operation in automatic identification in the embodiment.

An example of operation of the automatic identification will be described with reference to a flowchart of FIG. 2 together with FIG. 1.

When the user selects a data set for which to perform the identification processing and inputs an execution instruction of the automatic identification to the data processing device 2, the data processor 10 displays a setting screen for the automatic identification on the display 6 and causes the user to select a peak parameter to be used in the automatic identification (Step 101). An example of the setting screen is as illustrated in FIG. 3. On the setting screen illustrated in FIG. 3, as peak parameters, a peak number, an area (peak area), a height (peak height), an area % (peak area ratio), and a height % (peak height ratio) are displayed together with a condition of filtering to be performed using the peak parameters, and the user can set a peak parameter to be used for the automatic identification by checking a selection field of an optional peak parameter. Note that the peak numbers are numbers assigned in order of earlier elution from a separation column on the same chromatogram. Further, in a case where the information on component peaks on each of the chromatograms includes a spectrum information, a Mass spectrum, and/or m/z, the spectrum information, the Mass spectrum, and/or the m/z can be set as the peak parameters.

After a peak parameter for use in the automatic identification is determined, a chromatogram (=reference chromatogram) for use as a reference for the automatic identification is selected based on user input or automatically (Step 102). When the reference chromatogram is selected, all component peaks on the reference chromatogram become reference peaks.

The data processor 10 identifies one chromatogram (=target chromatogram) for which to perform the identification processing from chromatograms other than the reference chromatogram in the same data set (Step 103). Note that the order of chromatograms identified as the target chromatograms may be any order. For example, when an ID number is assigned to each chromatogram, the target chromatogram may be identified in ascending order of the ID numbers.

After identifying the target chromatogram, the data processor 10 identifies a reference peak to be identified (Step 104), and executes filtering of a component peak on the target chromatogram using a peak parameter (=reference parameter) of the reference peak (Step 105). In the filtering, a component peak on the target chromatogram having a peak parameter whose difference from the reference parameter falls within a range (for example, ±10%) defined by the filtering condition is identified as a candidate for a component peak corresponding to the reference peak (Step 106: Yes). At this time, in a case where there is no candidate for a component peak, the reference peak in the target chromatogram is not identified, and the processing proceeds to the identification processing for a next reference peak (Step 106: No, Step 110).

As a result of the filtering, in a case where there are a plurality of candidates for the component peak corresponding to the reference peak (Step 107: Yes), a plurality of the component peaks as candidates are ranked by similarity of each peak parameter to the reference peak, that is, how small a difference between each component peak of a plurality of the component peaks and the reference parameter is (Step 108), and a component peak having a highest rank is identified as a component peak corresponding to the reference peak (Step 109). Note that, in a case where there are a plurality of component peaks having a highest rank, a component peak having a highest peak elution rank (that is, having a smallest peak number) among the component peaks may be identified as a component peak corresponding to the reference peak, or a component having a smaller difference from the reference peak may be identified as an identified component.

The operation of Steps 104 to 109 is performed until the identification processing of all reference peaks for all chromatograms is completed (Steps 110 and 111).

Figure 4:
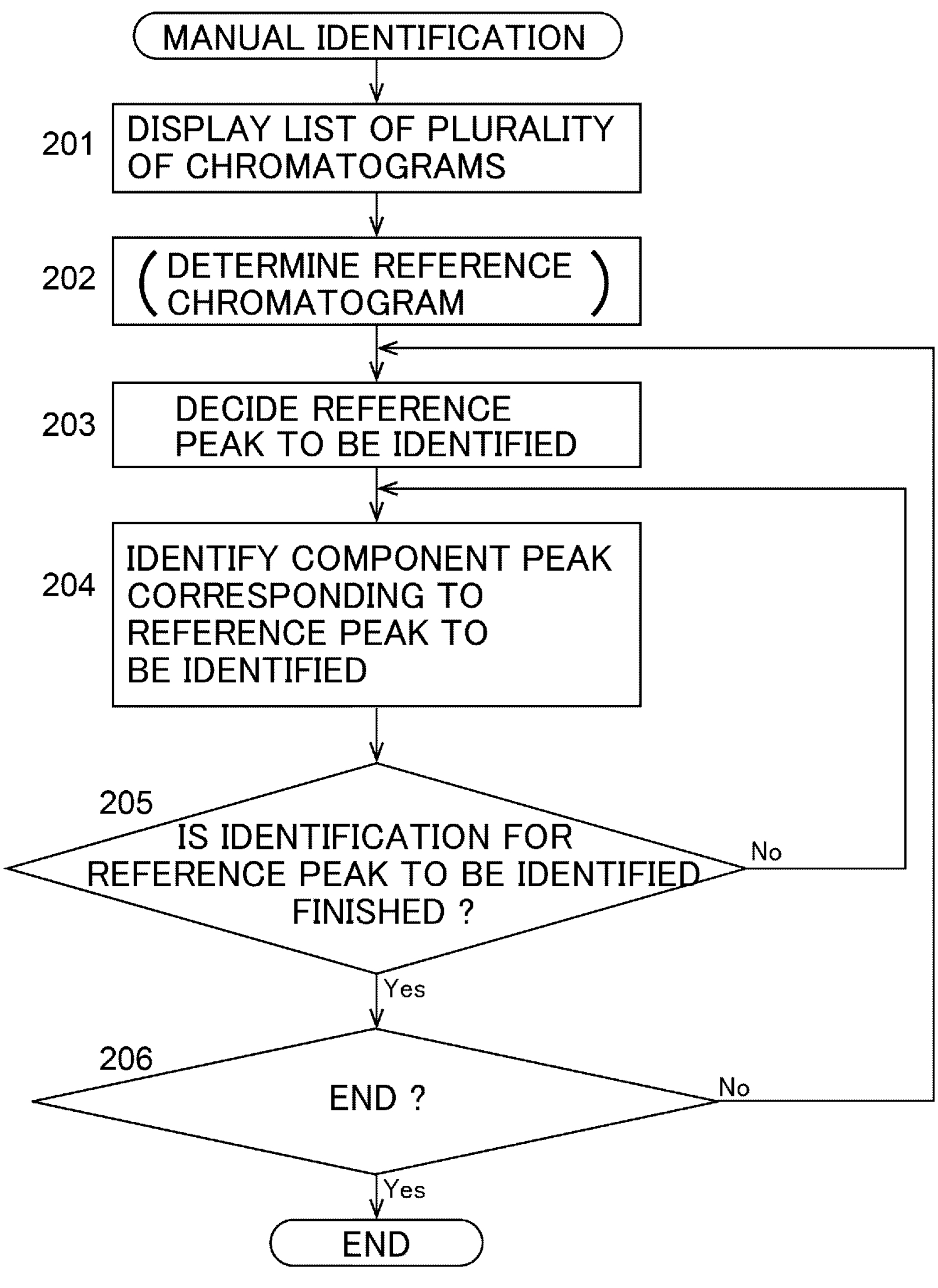
FIG. 4 is a flowchart illustrating an example of operation of searching for an analysis condition in the embodiment.

Next, an example of operation of the manual identification will be described with reference to a flowchart of FIG. 4 together with FIG. 1.

The manual identification can be executed after the automatic identification described above is executed, while the manual identification can also be executed independently of the automatic identification. When the manual identification is executed after the automatic identification is executed, a data set for which to perform the identification processing is already selected. In contrast, in a case where the automatic identification has not been executed, the user selects a data set for which to perform the identification processing.

Figure 5:
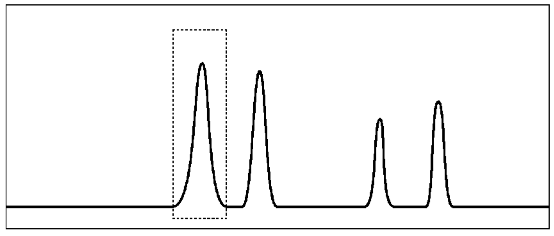
FIG. 5 is a diagram illustrating an example of a condition setting screen of identification processing in automatic identification of the embodiment.
Figure 5:
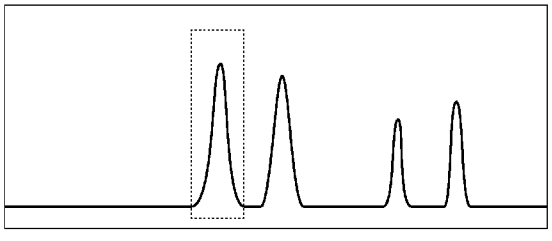
Figure 5:
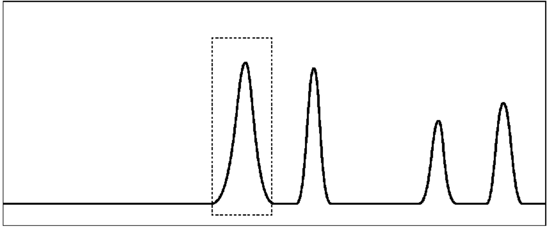

Regardless of whether or not the automatic identification is executed, the data processor 10 displays a list of a plurality of pieces of analysis data included in the data set to be identified on the display 6 together with each chromatogram (Step 201). An example of a list display screen of the analysis data and the chromatogram is as illustrated in FIG. 5. On the screen exemplified in FIG. 5, a plurality of chromatograms and a peak table of each chromatogram (a list of parameters of component peaks on each chromatogram) are vertically arranged for each analysis condition. The user can check a plurality of chromatograms and information on component peaks on the chromatograms on the same screen, and can easily grasp transition of retention time of a compound due to a difference in the analysis conditions.

The data processor 10 requires the user to select one chromatogram as the reference chromatogram in a state where a plurality of chromatograms and a peak table of each chromatogram are displayed in a list form (Step 202). All component peaks on the reference chromatogram identified by the user are reference peaks. Note that, in a case where the manual identification is executed after the automatic identification, since the reference chromatogram has already been identified in the process of the automatic identification, Step 202 can be omitted.

The data processor 10 further requires the user to select a reference peak to be identified in a state where a plurality of chromatograms and a peak table of each chromatogram are displayed in a list on the display 6 (Step 203). The reference peak can be selected on both the chromatogram and the peak table. The data processor 10 further requires the user to perform operation of identifying one or more component peaks corresponding to the reference peak to be identified from among component peaks on a plurality of the chromatograms displayed in the list or from the peak table of each chromatogram displayed in the list, and identifies each of the component peaks identified by the user as a component peak corresponding to the reference peak (Steps 204 and 205). The user can continuously or collectively execute the operation of identifying a plurality of component peaks corresponding to the same reference peak from among component peaks on a plurality of the chromatograms. Steps 203 to 205 above can be executed in sequence for all reference peaks optionally selected by the user (Step 206).

Here, the data processor 10 is configured to perform display such that the user can visually recognize component peaks associated with each other by the automatic identification or the manual identification on the list display screen of the chromatogram. For example, display is performed so that the user can easily recognize a correspondence relationship of component peaks in such a manner that, when the user selects one component peak on a certain chromatogram, all component peaks on other chromatograms corresponding to the component peak are highlighted. In the example of the screen display of FIG. 5, three component peaks are surrounded by broken lines on different chromatograms, and the user can easily recognize that these three component peaks correspond to each other.

Figure 6:
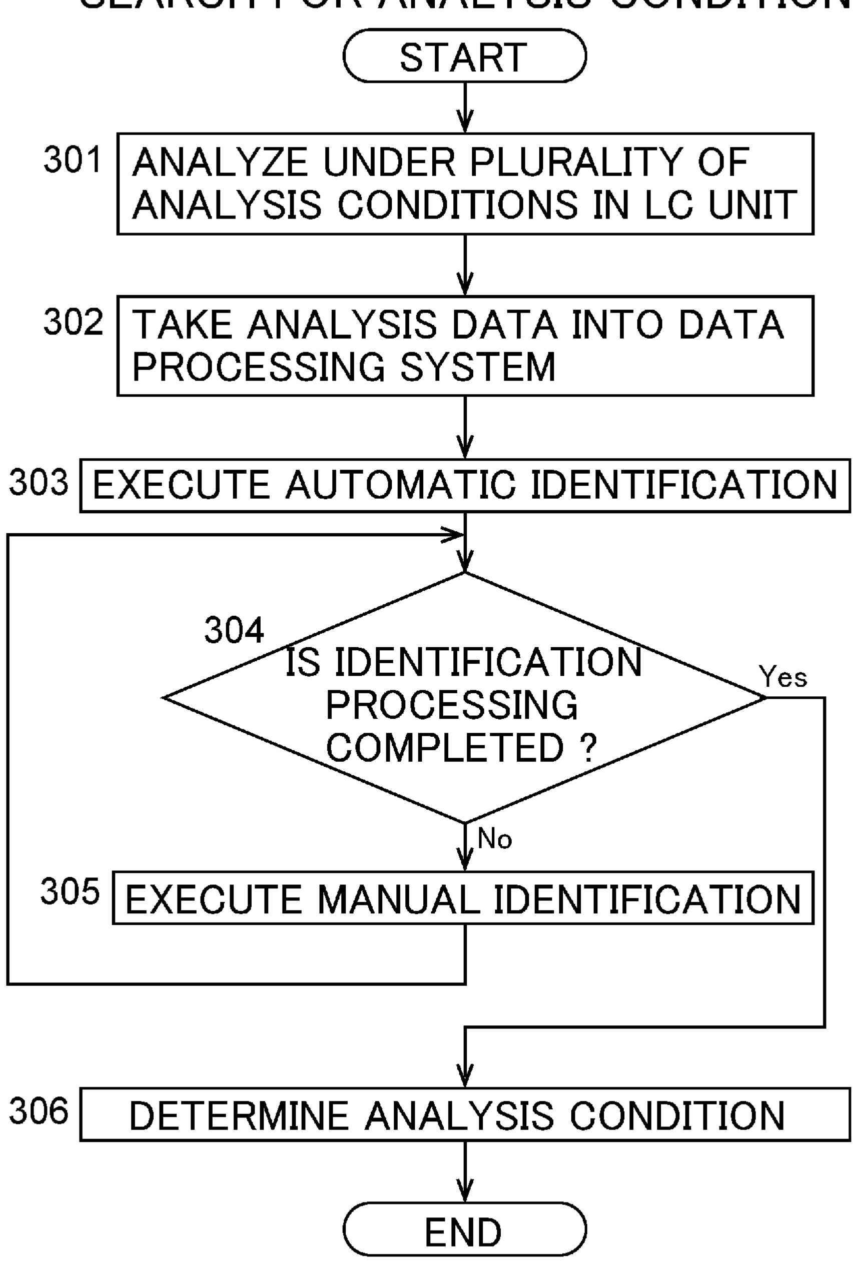
FIG. 6 is a diagram illustrating an example of a manual identification screen of the embodiment.

Next, an example of a method of searching for an optimum analysis condition for a sample using the automatic identification and the manual identification described above will be described with reference to a flowchart of FIG. 6 together with FIG. 1.

First, the sample for which an analysis condition is determined in the LC unit 100 is analyzed under a plurality of mutually different analysis conditions (Step 301), and a plurality of pieces of analysis data obtained by the analysis are taken into the data processing device 2 of the data processing system 1 (Step 302). In the data processing device 2, a plurality of chromatograms and a peak table of each chromatogram based on the analysis data obtained in each analysis are created, and these pieces of data become a data set.

Next, the automatic identification is executed to associate component peaks on a plurality of chromatograms included in the data set with each other (Step 303). In the automatic identification in which the identification processing is performed using filtering based on a specific peak parameter, identification of a component peak necessary for determination of an analysis condition may be incomplete. In view of the above, after executing the automatic identification, the user confirms whether or not identification of a component peak necessary for determining an analysis condition is completely performed by looking at a result of the automatic identification (Step 304), and in a case where the identification processing is incomplete, the user executes the manual identification (Step 305).

After the identification processing in which the manual identification is combined with the automatic identification as necessary is completed, the user determines an analysis condition considered to be optimum for the sample based on an identification result (Step 306).

Note that the embodiment described above merely illustrates an embodiment of the data processing system according to the present invention. The embodiment of the data processing system according to the present invention is as described below.

A first embodiment of the data processing system according to the present invention includes a data storage part that stores a plurality of chromatograms acquired by chromatographic analysis of the same sample under a plurality of mutually different analysis conditions, and a data processor that performs data processing on a plurality of the chromatograms stored in the data storage part. The data processor is capable of executing automatic identification for automatically performing identification processing. In the identification processing, one chromatogram selected from a plurality of the chromatograms stored in the data storage part is set as a reference chromatogram, a plurality of component peaks on the reference chromatogram are set as reference peaks, and it is identified which component peaks among component peaks on the other chromatograms than the reference chromatogram among a plurality of the chromatograms corresponds to each of a plurality of the reference peaks. In the automatic identification, the data processor is configured to set peak parameters of each of the plurality of reference peaks as reference parameters for each of the plurality of reference peaks, and to identify component peaks corresponding to each of a plurality of the reference peaks by executing filtering using the reference parameters for peak parameters of each of component peaks on the other chromatograms.

In a first aspect of the first embodiment, the peak parameter used for the filtering is at least one parameter selected from a peak elution rank, a peak area, a peak height, a peak area ratio, a peak height ratio, a spectral similarity, a Mass spectral similarity, and a m/z of base peak of Mass spectrum.

In a second aspect of the first embodiment, in the filtering executed for each of the reference peaks, the data processor is configured to identify component peaks each having a peak parameter including difference within a predetermined range from the reference parameters of each of the reference peaks as candidates for component peaks corresponding to each of the reference peaks. This second aspect can be combined with the first aspect.

Here, there may be a plurality of component peaks having parameters such as peak areas close to each other on the same chromatogram. In such a case, only by filtering using a parameter such as a peak area, a plurality of component peaks correspond to a filtering condition, and component peaks corresponding to a reference peak to be identified cannot be narrowed down to one. In view of the above, in the second aspect, when a plurality of component peaks on one chromatogram have been identified as candidates for a component peak corresponding to the same reference peak, the data processor may be configured to use a peak elution rank to set one of a plurality of the component peaks as the candidate. Further, when a plurality of component peaks on the same chromatogram have been identified as candidates for a component peak corresponding to the same reference peak, the data processor may be configured to set a component peak having a peak parameter including smaller difference from the reference parameter of the reference peak as the candidate. By these aspects, component peaks corresponding to a reference peak to be identified can be narrowed down to one.

In a third aspect of the first embodiment, the data processor is configured to require the user to select a chromatogram to be set as the reference chromatogram from a plurality of the chromatograms, and to set the chromatogram selected by the user as the reference chromatogram. Note that, the purpose of the identification processing is to identify a correspondence relationship of component peaks between a plurality of chromatograms. Accordingly, in principle, any chromatogram among a plurality of chromatograms may be used as a reference. However, depending on an analysis condition, a chromatogram in which a plurality of component peaks overlap each other may be formed, and it is not appropriate to use such a chromatogram as a reference. Therefore, the user is preferably able to select a chromatogram as a reference for identification. This third aspect can be combined with the first aspect and/or the second aspect described above.

In a fourth aspect of the first embodiment, the data processor configured to be able to execute manual identification in which the user manually performs the identification processing, and in the manual identification, the data processor is configured to require the user to select a reference peak to be identified among the reference peaks and to require the user to perform operation of identifying a component peak corresponding to the reference peak to be identified in a state where a list of the other chromatograms is displayed. According to such an aspect, even in a case where there is a component peak that cannot be identified by the automatic identification by filtering using a peak parameter, the user can manually perform the identification processing on such a component peak. This fourth aspect can be freely combined with the first aspect, the second aspect, and/or the third aspect described above.

In the fourth aspect, in the manual identification, the data processor is preferably configured to enable the user to execute operation of continuously or collectively identifying a plurality of component peaks corresponding to the reference peak to be identified in a state where the list of the other chromatograms is displayed. This improves the efficiency of the identification processing of a component peak.

Further, in the fourth aspect, the data processor is configured to be capable of executing the manual identification after executing the automatic identification.

In a fifth aspect of the first embodiment, the data processor is configured to perform display common to a plurality of component peaks associated with each other by the identification processing so that the user can visually recognize a correspondence relationship of component peaks between a plurality of the chromatograms. According to such an aspect, component peaks on different chromatograms associated by the identification processing can be easily recognized, and transition of a component peak due to a difference in analysis condition can be easily grasped.

A second embodiment of the data processing system according to the present invention includes a data storage part that stores a plurality of chromatograms acquired by chromatographic analysis of the same sample under a plurality of mutually different analysis conditions, and a data processor that performs data processing on a plurality of the chromatograms stored in the data storage part. The data processor can execute manual identification for a user to manually perform identification processing. In the manual identification, one chromatogram selected from a plurality of the chromatograms stored in the data storage part is set as a reference chromatogram, a plurality of component peaks on the reference chromatogram are set as reference peaks, and it is identified which component peaks among component peaks on the other chromatograms other than the reference chromatogram among a plurality of the chromatograms corresponds to each of a plurality of the reference peaks, and in the manual identification, the data processor is configured to require the user to select a reference peak to be identified among a plurality of the reference peaks and to enable the user to continuously or collectively execute operation of identifying a plurality of component peaks corresponding to the reference peak to be identified in a state where a list of the other chromatograms is displayed.

In the second embodiment, the data processor is preferably configured to perform display common to a plurality of component peaks associated with each other so that the user can visually recognize a correspondence relationship of component peaks between a plurality of the chromatograms.

In this manner, component peaks on different chromatograms associated by the identification processing can be easily recognized, and transition of a component peak due to a difference in analysis condition can be easily grasped.

DESCRIPTION OF REFERENCE SIGNS

1: data processing system
2: data processing device
4: input device
6: display
8: data storage part
10: data processor
100: LC unit

What is claimed is:

1. A data processing system for a chromatograph, comprising:

a data storage part that stores a first chromatogram acquired by a first chromatographic analysis of a sample comprising a plurality of components under a first analysis condition and a second chromatogram acquired by a second chromatographic analysis of the same sample as the first chromatographic analysis under a second condition different from the first condition;

a data processor that performs data processing on the first and second chromatograms stored in the data storage part; and a display device to display information given by the data processor, wherein the processor is configured to present a plurality of candidate peak parameters to a user and receive a selected peak parameter which is selected among the candidate peak parameters from the user, identify a target peak among a plurality of peaks of the first chromatogram and a first value of the selected peak parameter of the target peak, identify a corresponding peak having the closest value of the selected peak parameter to the first value of the selected peak parameter of the target peak among a plurality of peaks on the second chromatogram, and display, on the display device, the corresponding peak in a visually different manner from the other peaks in the plurality of peaks on the second chromatogram.

2. The data processing system for a chromatograph according to claim 1, wherein the plurality of candidate peak parameters include at least one parameter among a peak elution rank, a peak area, a peak height, a peak area ratio, a peak height ratio, a spectral similarity, a Mass spectral similarity, and a m/z of base peak of Mass spectrum.

3. The data processing system for a chromatograph according to claim 1, wherein when a plurality of peaks having the closest value of the selected peak parameter to the first value of the selected peak parameter of the target peak are present, the data processor is configured to identify one peak having the highest peak elution rank in the plurality of peaks having the closest value to the first value of the selected peak parameter of the target peak as the corresponding peak to the target peak.

* * * * *